(12) United States Patent
Halasz et al.

(10) Patent No.: US 7,650,629 B2
(45) Date of Patent: Jan. 19, 2010

(54) ENHANCED TRUST RELATIONSHIP IN AN IEEE 802.1×NETWORK

(75) Inventors: David E. Halasz, Stow, OH (US); Merwyn B. Andrade, San Jose, CA (US); Pauline Shuen, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 246 days.

(21) Appl. No.: 12/017,663

(22) Filed: Jan. 22, 2008

(65) Prior Publication Data

US 2008/0134288 A1 Jun. 5, 2008

Related U.S. Application Data

(63) Continuation of application No. 10/041,005, filed on Jan. 7, 2002, now Pat. No. 7,325,246.

(51) Int. Cl.
| | |
|---|---|
| G06F 7/04 | (2006.01) |
| G06F 17/30 | (2006.01) |
| G06K 9/00 | (2006.01) |
| H04L 9/32 | (2006.01) |
| G06F 15/16 | (2006.01) |
| G06F 17/00 | (2006.01) |
| H04L 9/00 | (2006.01) |
| G06F 15/173 | (2006.01) |
| H04M 1/64 | (2006.01) |
| H04M 1/66 | (2006.01) |
| H04M 1/68 | (2006.01) |
| H04M 3/42 | (2006.01) |

(52) U.S. Cl. ............... 726/2; 726/3; 726/4; 726/12; 726/21; 713/154; 713/155; 713/158; 709/219; 709/223; 709/225; 709/229; 379/88.17; 455/411; 455/414.1

(58) Field of Classification Search ............. 713/168, 713/171, 181, 183; 726/2–4, 12, 21; 709/219, 709/223, 225, 229; 379/88.17; 455/411, 455/414.1
See application file for complete search history.

(56) References Cited

U.S. PATENT DOCUMENTS

| | | | |
|---|---|---|---|
| 6,657,981 B1 * | 12/2003 | Lee et al. ................. 370/331 |
| 6,707,425 B2 * | 3/2004 | Louhi ...................... 342/359 |
| 7,042,988 B2 * | 5/2006 | Juitt et al. ............... 379/88.17 |
| 7,174,564 B1 * | 2/2007 | Weatherspoon et al. ...... 726/2 |
| 2003/0012163 A1 * | 1/2003 | Cafarelli et al. ........... 370/338 |
| 2003/0041175 A2 * | 2/2003 | Singhal et al. ............ 709/249 |
| 2003/0185169 A1 * | 10/2003 | Higgins .................... 370/329 |
| 2004/0010713 A1 * | 1/2004 | Vollbrecht et al. ......... 713/201 |
| 2004/0019786 A1 * | 1/2004 | Zorn et al. ................. 713/168 |
| 2004/0062243 A1 * | 4/2004 | Zhang et al. .............. 370/392 |
| 2006/0052085 A1 * | 3/2006 | Rodriguez et al. ......... 455/411 |

* cited by examiner

*Primary Examiner*—Shin-Hon Chen
(74) *Attorney, Agent, or Firm*—Tucker Ellis & West LLP

(57) ABSTRACT

Architecture for providing access to an IEEE 802.1x network. A trust relationship is created between a switch of the network and an access point of the network such that the access point is authorized to communicate over the network. The trust relationship is then extended from the access point to a wireless client requesting connection to the network such that access to the network by said wireless client is authorized.

15 Claims, 3 Drawing Sheets

ENHANCED TRUST RELATIONSHIP IN AN IEEE 802.1×NETWORK

CROSS-REFERENCE TO RELATED APPLICATIONS

This application is a continuation of U.S. application Ser. No. 10/041,005, filed on Jan. 7, 2002 now U.S. Pat. No. 7,325,246.

TECHNICAL FIELD

This invention is related to controlling access in networks, and more specifically, to controlling access of a wireless client to a network in an IEEE 802.1x regime.

BACKGROUND OF THE INVENTION

The IEEE (Institute of Electrical and Electronic Engineers, Inc) 802 Local Area Network standards provide guidelines for allowing users to physically connect to a network and access basic services provided therein. However, it has become more evident in recent years that controlled access is a necessity with the large amount of sensitive information that is communicated over networks of virtually any size. Access can be restricted by any number of methods, including user logins and passwords, network identification of a unique identification number embedded within the network interface card, call-back schemes for dial-up access, and others.

In an IEEE 802.3 network, such conventional wired network access protection schemes can be easily defeated since encryption is not used between network devices. Thus the use of a switch or bridge as an access point for protecting against unauthorized network access in a wired regime can be problematic. For example, if a switch port was made physically available in a conference room for connection thereto by a first wireless user having a laptop, connection to the local network would then be established through the switch. Network access for the wireless user is granted only through that switch port upon successful authentication. However, a problem with this implementation is that simply connecting a hub to the LAN between the switch and the access point can easily defeat it. Once the first wireless user connects to the LAN through a port of the hub, and is properly authenticated on the switch port, a second wired user could then plug-in to one of the hub ports and gain access to the network, since the switch port has authenticated the first user, and does not care about the other connected and unauthenticated users so long as the first wireless user provides authentication traffic to the switch.

The IEEE 802.1x standard offers an additional method for controlling network access utilizing port control. Port-based network access control makes use of the physical access characteristics of an IEEE 802 LAN infrastructure in order to provide a means of authenticating and authorizing devices attached to a switch port that has point-to-point connection characteristics. Thus in existing IEEE 802.1x implementations, when a network device designed as an access point (AP) comes online, the AP authenticates through the switch to an authentication server. When properly authenticated, the switch port becomes "opened" up for that authenticated AP. However, in this port-control implementation, since the port has been opened for the authenticated AP, any other unauthenticated client can now also connect through that AP and gain full access to the network. Such port authorization related to switches, bridges and routers needs to be made more secure since such network devices form the switch fabric that provide interconnectivity between the extensive number of networks in existence today. It would be advantageous, however, to have greater control over the use of device ports.

What is needed, instead of port control, is to provide more extensive control between wired and wireless entities, such that the trust relationship is extended beyond the access point to a wireless client. Once properly authenticated, the PC client is then established as a trusted client, insofar as the switch is concerned, and the information communicated between the wireless PC client and the switch is passed through the AP unimpeded and unaltered.

SUMMARY OF THE INVENTION

The present invention disclosed and claimed herein, in one aspect thereof, comprises architecture for providing access to an IEEE 802.1x network. A trust relationship is created between a switch of the network and an access point of the network such that the access point is authorized to communicate over the network. The trust relationship is then extended from the access point to a wireless client requesting connection to the network such that access to the network by said wireless client is authorized.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

The disclosed method offers greater control over network access in point-to-point physical connections of local area networks (LANs) where once a first trusted user authorizes a switch port for use, the first trusted user can then extend the trust relationship to other users such that access to the network is gained through the same switch port. When the first trust relationship of an access point (AP) is extended to a wireless client, the wireless client is then established, insofar as the switch is concerned, as a trusted wireless client, and the information communicated between the wireless client and the switch is passed through an the AP unimpeded and unaltered. The disclosed architecture authorizes the user, and not just the port. Thus if a second client were to try and gain access to the network after the first client was properly authenticated, as described hereinabove with respect to an 802.3 Ethernet LAN, access attempted by the second client would fail.

Figure 1A:
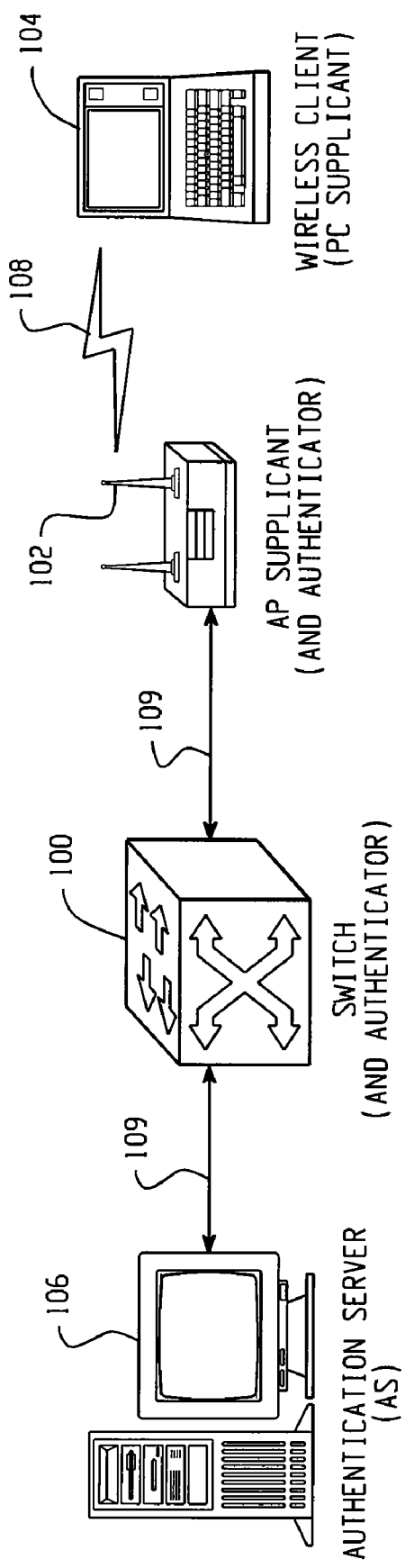
FIG. 1a illustrates a network block diagram that operates to control network access of a wireless client, in accordance with a disclosed embodiment.

Referring now to FIG. 1a, there is illustrated a block diagram that operates to control network access of a wireless client 104, in accordance with a disclosed embodiment. In an IEEE 802.1x regime, the trust relationships are established utilizing conventional encryption schemes. A basic IEEE 802.1x implementation (not illustrated topologically) consists of a switch 100 that operates to provide interconnectivity between a plurality of network devices disposed on a network 109 and optionally between a plurality of networks. An access point 102 (which may contain a "supplicant" and an "authenticator" in IEEE 802.1x terminology, and hereinafter denoted as "AP") provides the communicative transition point between the dedicated wired network 109 and a wireless client 104 (also called a "supplicant" in IEEE 802.1x terminology). An authentication server (AS) 106 is disposed on the wired network 109 to provide authentication services to those network entities requiring such a service. The AS 106 can be configured to run a RADIUS (Remote Authentication Dial-In User Service) protocol for authentication and authorization services. The AS 106 provides the authentication and authorization services to a network entity that functions as an authenticator. (A network entity can take the role of an authenticator when that entity performs authentication to the AS 106 on behalf of another entity requesting access to the network.) This service determines, from credentials provided by the AP 102, whether the AP 102 is authorized to access the services controlled by the authenticator (in this scenario, the switch 100). Note that the AS 106 can be co-located with an authenticator, or it can be accessed remotely via a network to which the authenticator has access. Additionally, the network 109 can be a global communication network, e.g., the Internet, such that authentication occurs over great distances from a remote location disposed thereon to the AS 106.

Authentication occurs primarily at system initialization time, or when a supplicant (such as the AP 102, or wireless client 104) requests connection to a port of an authenticator system or when authorized access has been become unauthorized, and subsequently needs to be reauthorized. (A system is defined as a device that is attached to a LAN by one or more ports, e.g., end stations, servers, MAC bridges, and routers.)

The AP 102 can authenticate to the AS 106 utilizing any one of a number of conventional authentication algorithms, e.g., EAP-Cisco Wireless, or a certificate-based scheme such as EAP-TLS.

Conventionally, when the AP 102 comes online, the switch 100 functions as an authenticator. The switch 100 receives a connection request from the AP 102 and passes the request and information related to the AP 102 to the AS 106. The AS 106 then checks its authentication database for preexisting identity information about the AP 102, depending on the authentication type. For example, where the authentication type utilizes a username and password as identity information, all or some of the identity information is passed from the AP 102 across the network to the switch 100 and from the switch 100 to the AS 106. If the AP identity information is not part of the AS database, the connection request of the AP 102 is discarded. When the authentication protocol is, e.g., EAP-Cisco Wireless, and the corresponding AP identity information is found in the AS database, the AS 106 mutually authenticates with the AP 102, based on the authentication type. Once mutual authentication between the AS 106 and the AP 102 is successful, a trust relationship is established between the AP 102 and the AS 106. The AP 102 is now trusted, and a message authentication check key exists between the switch 100 and AP 102.

At the end of the authentication handshaking between the AP 102 and AS 106, the switch 100 is notified of the successful authentication, and updates its database with the MAC address of the AP 102. Future authentications by the AP 102 through the switch 100 are no longer required to the AS 106, unless the AP 102 has become unauthorized for some reason.

The trust relationship between switch 100 and the AP 102 is then formed across the network channel. A second access point (not shown) connected to the network would have a correspondingly unique message authentication check key. Packets between the AP 102 and switch 100 can be determined to be valid by checking message digests. The message digests get calculated by using the message authentication check key that was established during authentication. Note that until authentication has successfully completed for the AP 102, a network connection request by the wireless client 104 via the AP 102 is blocked. Only the AP 102 has access to the authenticator system in order to perform authentication exchanges. This is not to say that the AS 106 is a single-threaded system, but is a multi-threaded system in that the AS 106 is operable to process multiple authentication requests substantially simultaneously from many network devices requesting such services.

The trust relationship now exists between the switch 100 and the AP 102 in accordance with the IEEE 802.1x standard, and the AP 102 is allowed full access to the services offered on the network via the controlled port of the switch 100. If, at this point, no other system authorizations would be required, the switch 100 would allow all traffic from the AP 102, not "knowing" that the packet traffic was actually coming from a client, or potentially more than one client, the latter which have not been properly authenticated.

In accordance with the disclosed architecture, the trust relationship is now extended to the wireless client 104 in that once authentication of the wireless client 104 is completed, the wireless client 104 will be a trusted client insofar as the switch 100 is concerned. Additionally, a session key is derived for the wireless client 104 in the same manner as for the AP 102 during its authentication process through the switch 100 to the AS 106. Thus first a message authentication check key exists between the AP 102 and the switch 100, and a session key exists between the AP 102 and the wireless client 104. The derived session key for the wireless client 104 uniquely encrypts the wireless client 104 to the AP 102 traffic, and the message authentication check key for the AP 102 uniquely verifies the AP 102 to the switch 100.

In operation, the trust relationship is extended to the wireless client 104 in the following manner. Once the dedicated network is operational and the wired entities are authenticated, the wireless client 104 seeking access to the network then needs to be authenticated. The wireless client 104, using conventional and encrypted air protocols, communicates a connection request via a communication link 108 to the AP 102, and which AP 102 now takes on an authenticator role. The AP 102 processes the connection request message by sending the wireless client 104 authentication to the AS 106. The packet information is sent to the switch 100 such that the switch 100 recognizes the traffic as coming only from the AP 102. The switch 100 then recognizes the traffic as coming from the authorized AP 102, and passes it through to the AS 106. Until such authorization occurs, the AP 102 restricts any uncontrolled traffic of the wireless client 104 beyond the AP 102, allowing access only to the AP 102 to perform authentication exchanges, or access services provided by the AP 102 that are not subject to access control restrictions placed on that port.

The AP 102 and the AS 106 continue to exchange information using EAP (Extensible Authentication Protocol) until the AS 106 has completed its authentication and reported the outcome of the authentication process. The authentication server 106 informs the AP 102, which depending upon the outcome, either allows traffic, or discards traffic coming from the wireless client 104. If the wireless client 104 is authorized, the AP 102 informs the switch 100 that the wireless client 104 MAC address is authorized. The AP 102 may also forward other information to the switch 100, such as an access control list (ACL) and quality-of-service (QoS) parameters for the wireless client 104. The switch 100 verifies that the AP 102 is sending the message by the AP 102 including a message digest, in the authorize packet. The switch 100 allows traffic from the wireless client 104 by storing the MAC address of the wireless client 104 in the switch database. The AP 102 then allows all traffic from the wireless client 104 as controlled traffic, which is handled differently by the AP 102. The AP 102 allows traffic to pass from the wireless client 104 unaltered and unimpeded directly to the switch 100. Once the wireless client 104 is authenticated, the AP 102 routes the client packet traffic as controlled traffic, and the AP 102 is no longer acting as a proxy, but simply passing the raw client packet traffic through to the switch 100. The switch 100 then interrogates the raw packet traffic coming through the AP 102 for authorized MAC addresses. All future traffic is then checked against the switch database of authorized MAC addresses in order to determine whether the traffic will be allowed.

Note also that the wireless client 104 comprises numerous wireless devices, including, but not limited to, a laptop/notebook portable computer having Cardbus network adapter suitable for wireless communication with a wired network, an electronic tablet having a suitable wireless network adapter, a handheld device containing a suitable wireless network adapter for communicating to a wired network, etc.

Figure 1B:
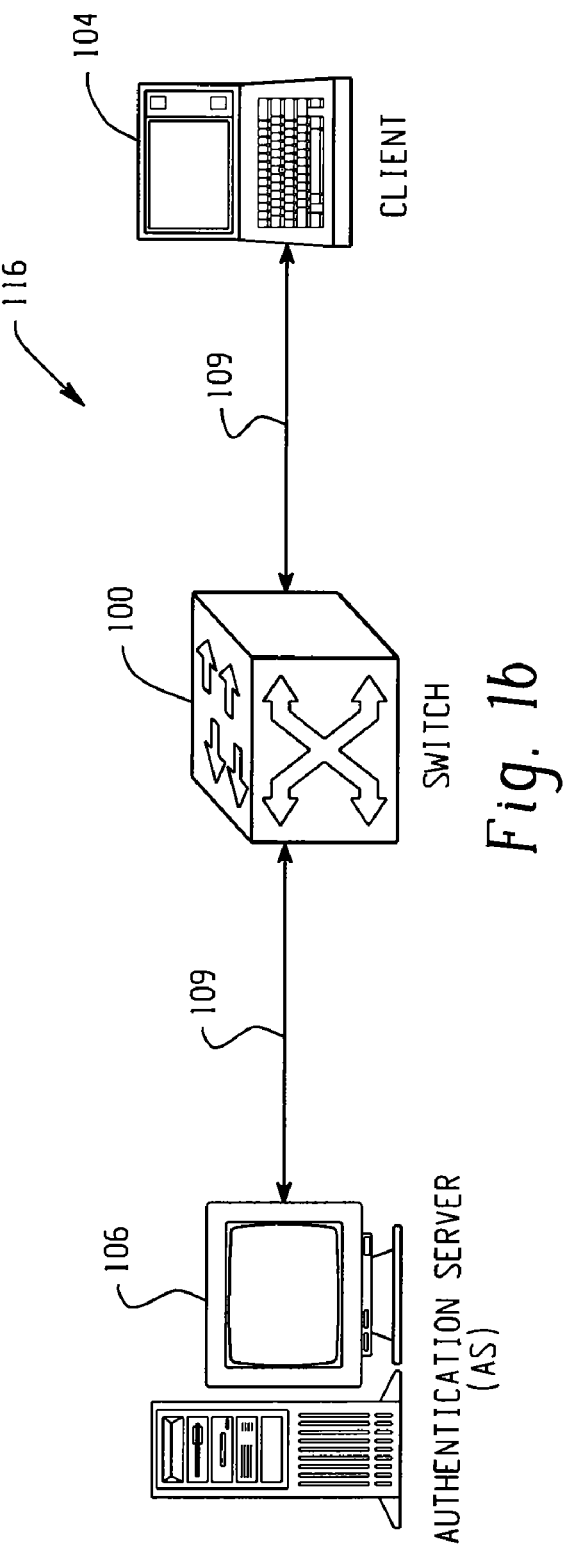
FIG. 1b illustrates a network block diagram that operates to control network access of a wired client, in accordance with a disclosed embodiment.

Referring now to FIG. 1b, there is illustrated a general block diagram of an alternative embodiment wired system 116 that utilizes the described protocol. The wired system 116 includes the AS 106, and switch 100 disposed on the network 109. In this particular embodiment, the AP 102 of FIG. 1a is replaced with the switch 100. The switch 100 is configured to run the IEEE 802.1x protocol. Since the client 104 utilizes a wired connection, and no encryption is available between the client 104 and the switch 100. Thus the trust relationship established first between the switch 100 and the AS 106 must now be extended to the client 104. The client 104 can be easily converted to operate either wirelessly according to FIG. 1a or in the wired environment of FIG. 1b by making the appropriate hardware implementations.

Figure 2:
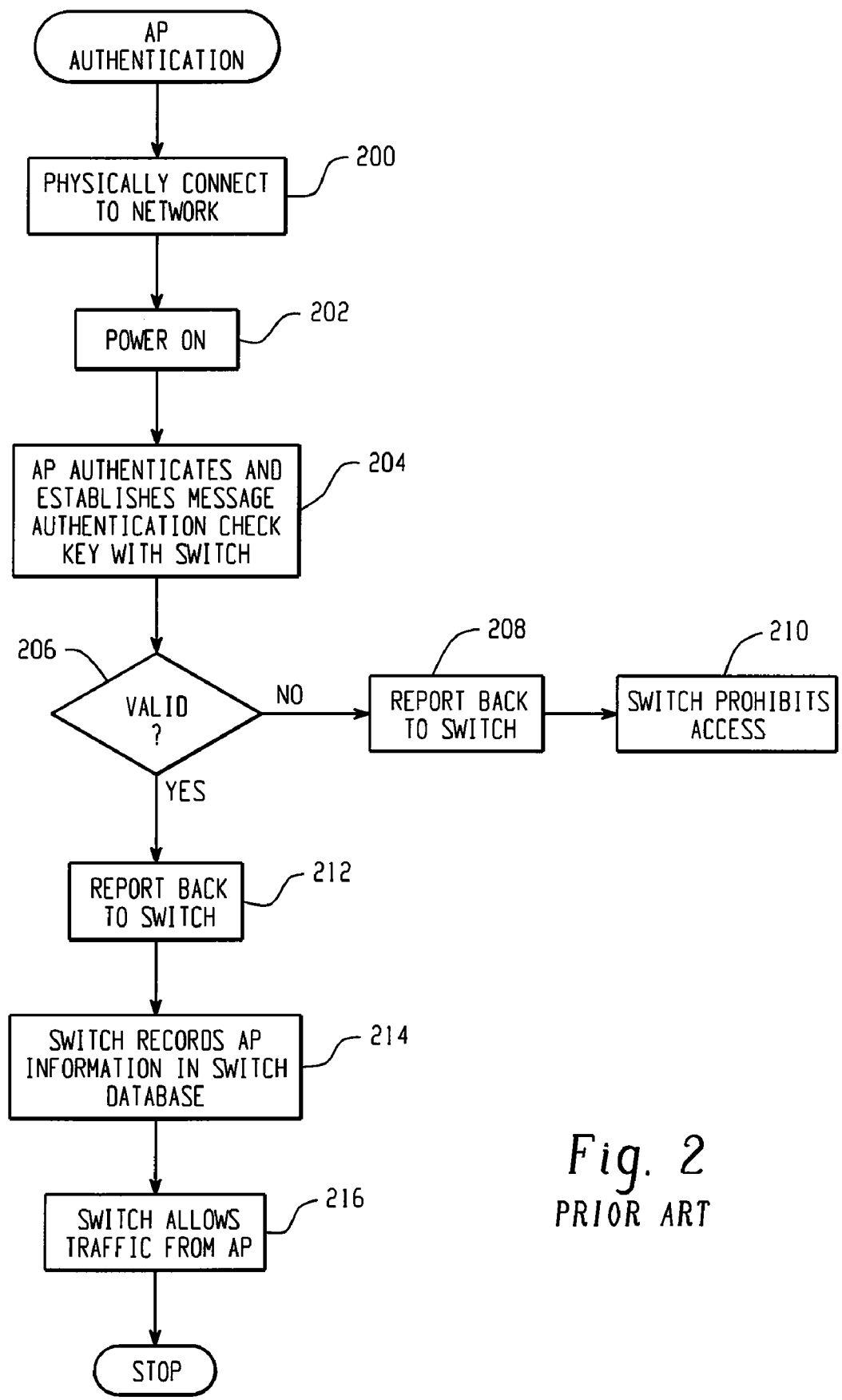
FIG. 2 illustrates a flow chart of the conventional process for authentication of an access point.

Referring now to FIG. 2, there is illustrated a flow chart of the conventional process for authentication of an AP 102. The discussion encompasses connecting the AP 102 to the network for the first time, however, it can be appreciated that subsequent operation may merely require powering the AP 102, after which authentication occurs, or utilizing a continually-powered-and-connected AP 102 such authentication is required only once at power-up, and only thereafter is reauthorization is requested.

Flow begins at a function block 200 where the AP system 102 is connected to the wired network. Power is then applied to the AP 102, as indicated in a function block 202. Flow is to a function block 204 where the AP 102 authenticates and establishes a message authentication check key with the switch 100. Flow is to a decision block 206 where the AS 106 determines if the AP 102 is an authorized network device. If after comparing the received AP identity information with an authentication database, and determining that the AP 102 is not in the database, flow is out the "N" path to a function block 208 where the AS 106 reports back to the switch 100 that authentication has failed. Flow is to a function block 210 where the switch 100 then prohibits any packet traffic from the AP 102.

On the other hand, if the AS 106 finds that the received AP identity information is in the authentication database, flow is out the "Y" path of decision block 206 to a function block 212 where the AS 106 reports back to the switch 100 that the AP 102 is an authorized system. The switch 100 then adds selected information about the AP 102 in its switch database, e.g., the MAC address of the AP 102 and the message authentication check key, as indicated in a function block 214. Flow is to a function block 216 where the switch 100 allows any future traffic from the AP 102 to pass through the switch 100. The message authentication check key is stored for future use. The message authentication check key is used to "sign" MAC address authorization packets to the switch 100, after a wireless client authenticates. The process then reaches a Stop point.

Figure 3:
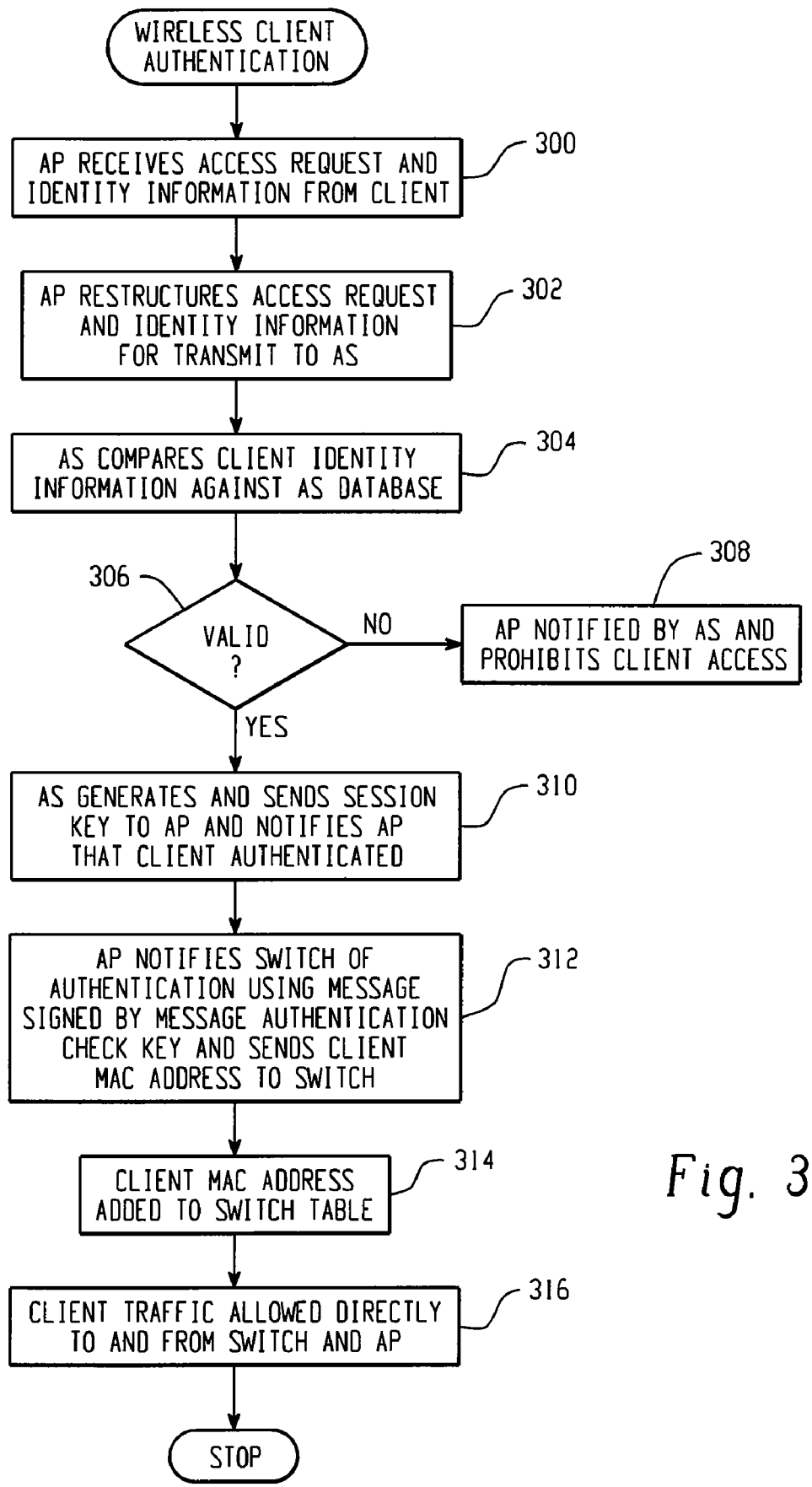
FIG. 3 illustrates a flow chart of the information exchange between the various entities for processing requested access by a wireless client 104, in accordance with a disclosed embodiment.

Referring now to FIG. 3, there is illustrated a flow chart of the information exchange between the various entities for processing requested access by the wireless client 104, in accordance with a disclosed embodiment. After the wireless client 104 powers up and reaches an initial state, authentication of the client 104 commences. Flow is to a function block 300 where the AP 102 receives access request packet traffic with client identity information from the client 104. In a function block 302, the AP 102 restructures the client traffic, and forwards the traffic through the switch 100 to the AS 106. As mentioned hereinabove, once the AP 102 becomes a trusted entity, subsequent packet traffic therefrom moves unimpeded through the switch 100 to the AS 106, and other network services. Flow is then to function block 304 where the AS 106 compares the client identity information against an AS database of authorized entities.

In a decision block 306, a determination is made whether the client 104 is authorized to access the network. If the client identity information is not found in the AS database, flow is out the "N" path to function block 308 where the AS 106 notifies the AP 102 that authentication failed, and to prohibit network access to the client 104. If authentication is successful, flow is out the "Y" path of decision block 306 to a function block 310 where the AS 106 generates a session key, and sends the key and authorization state to the AP 102. In a function block 312, the AP 102 then notifies the switch 100 (with packet traffic signed by the message authentication check key) that authentication state of the client 104 was successful, and also sends the MAC address of the client 104 to the switch 100. The AP 102 may also forward other information to the switch 100, such as an ACL and QoS parameters for the wireless client 104. The digest created by the shared message authentication check key established between the switch 100 and AP 102 is used to verify the transmitted authentication state and wireless client MAC address. The switch 100 adds the MAC address of the client 104 to its switch table database, as indicated in a function block 314. Flow is to a function block 316 where the client 104 is now a trusted entity, and subsequent client traffic is then allowed directly to and from the switch 100 and AP 102. The process then reaches a Stop point.

The trust relationship has now been extended to the authorized wireless client 104 in that the AP 102 and the switch 100 now allow the packet traffic of the wireless client 104 to pass unimpeded and unaltered directly through to the wired network backbone. The presence of the encrypted session established between the wireless client 104 and the AP 102 substantially reduces the possibly of an unauthorized wireless client from connecting to the network via the AP 102, and the switch 100 now having further information about the wireless client 104 further reduces the possibly of another client succeeding in connecting to the wired backbone.

As indicated in the foregoing discussion, multiple wireless clients and access points can access a single network with each establishing encrypted links. When fully authenticated, each wireless client will have its MAC address listed in the switch table as an authorized source of traffic. It can be appreciated that many conventional networks also include more than one switch 100, such that the switches are configured in parallel or in a serial fashion.

Although the preferred embodiment has been described in detail, it should be understood that various changes, substitutions and alterations can be made therein without departing from the spirit and scope of the invention as defined by the appended claims.

What is claimed is:

1. An apparatus, comprising
   an authenticator configured to communicate with an authentication server disposed on an associated network;
   an authorized address table comprising a list of addresses authorized to communicate on the associated network in communication with the authenticator;
   wherein the authenticator is configured to authenticate a first device having a first address, with the authentication server and to store the first address in the authorized address table responsive to successfully authenticating the first device;
   wherein the authenticator is configured to forward authentication packets from the first device acting as an authenticator for a client having a client address after successfully authenticating the first device to the authentication server;
   wherein the authenticator is configured to add the client address to the authorized address table responsive to receiving a message from the first device indicating that the client has successfully authenticated; and
   wherein the authenticator is configured to allow the client to communicate with the associated network after adding the client address to the authorized address table.

2. The apparatus of claim 1, wherein the authenticator establishes a session key with the first device responsive to successfully authenticating the first device.

3. The apparatus of claim 2, wherein the session key uniquely identifies the first device to the authenticator.

4. The apparatus of claim 3, wherein the authenticator is configured to verify the message from the first device indicating the client has successfully authenticated is signed by the session key.

5. The apparatus of claim 4, wherein the authenticator obtains an access control list for the client from the message from the first device indicating the client has successfully authenticated.

6. The apparatus of claim 4, wherein the authenticator obtains quality of service data for the client from the message from the first device indicating the client has successfully authenticated.

7. The apparatus of claim 3, wherein the authenticator is configured to authenticate a second device having a second address with the authentication server and to store the second address in the authorized address table responsive to successfully authenticating the second device; and
   wherein the authenticator establishes a second session key with the second device responsive to successfully authenticating the second device, the second session key uniquely identifying the second device to the authenticator.

8. The apparatus of claim 7, wherein the authenticator is configured to forward authentication packets from a second client having a second client address received from the second device to the authentication server after the second device has successfully authenticated;
   wherein the authenticator is configured to add the second client address to the authorized address table responsive to receiving a message from the second device indicating that the second client has successfully authenticated after the second device has successfully authenticated; and
   wherein the authenticator is configured to allow the second client to communicate with the associated network after adding the second client address to the authorized address table.

9. The apparatus of claim 8, wherein the authenticator verifies the message from the second device indicating that the second client has successfully authenticated is signed by the second session key before adding the second client address to the authorized address table.

10. The apparatus of claim 2, wherein the authenticator receives the session key for the first device from the authentication server.

11. The apparatus of claim 1, wherein the first address is a Media Access Control (MAC) address and the client address is a MAC address.

12. The apparatus of claim 1, wherein the authenticator authenticates itself with the authentication server prior to communicating with the first device.

13. The apparatus of claim 1, wherein the authenticator verifies all subsequent communication for the client with the authorized address table before forwarding the subsequent communication onto the associated network.

14. A method, comprising:
    receiving an authentication request from a first supplicant having a first address;
    authenticating the first supplicant;
    adding the first address to an authorized address table responsive to successfully authenticating the first supplicant;
    forwarding authentication packets from the first supplicant which is acting as an authenticator for a second supplicant having a second address after adding the first address to the authorized address table;
    adding the second address corresponding to the second supplicant to the authorized address table responsive to receiving a message from the first supplicant indicating that the first device has successfully authenticated the second supplicant after the first address was added to the authorized address table; and
    allowing the second supplicant access to a network after adding the second address to the authorized address table.

15. A method according to claim 14, wherein authenticating a first supplicant further comprises establishing a session key with the first supplicant responsive to successfully authenticating the first supplicant; and
    wherein adding a second address further comprises verifying the message from the first device is signed with the session key.

* * * * *